June 6, 1950  A. G. GURRIES ET AL  2,510,470
DRAWBAR EXTENSION FOR LAND LEVELERS
Filed Nov. 16, 1948
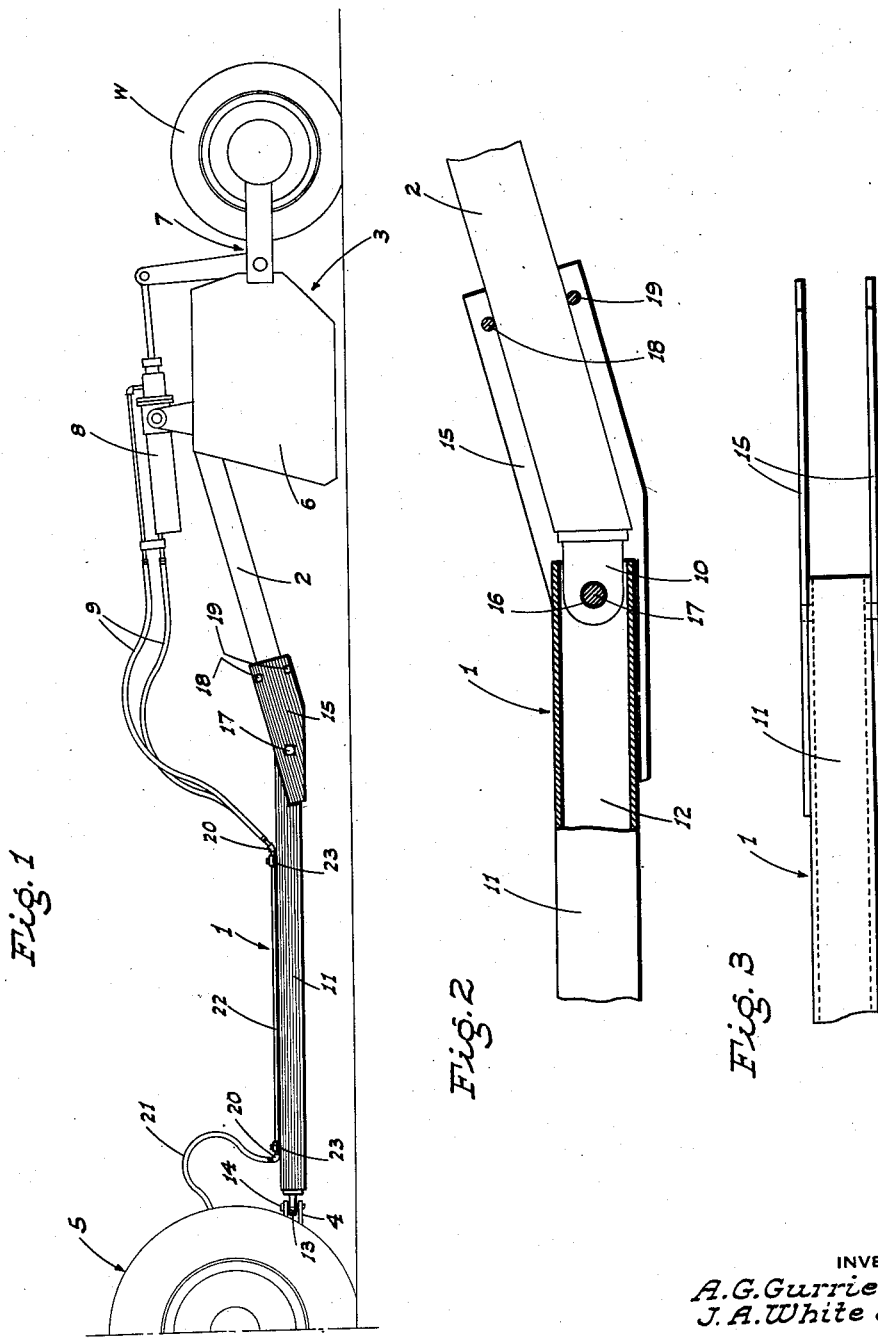
INVENTORS
A.G.Gurries
J.A.White Jr.

Patented June 6, 1950

2,510,470

UNITED STATES PATENT OFFICE 2,510,470

DRAWBAR EXTENSION FOR LAND LEVELERS

Albert G. Gurries and John A. White, Jr., Gilroy, Calif., assignors, by direct and mesne assignments, to Be-Ge Manufacturing Co., Gilroy, Calif., a corporation of California Application November 16, 1948, Serial No. 60,358

7 Claims. (Cl. 280—33.44)

This invention relates in general to earth scrapers or levelers of the type including a forwardly projecting drawbar adapted to connect to a tractor. This drawbar conventionally is relatively short, but for certain leveling operations it is desired that the drawbar be extended in length so that the scraper or leveler trails a greater distance behind the tractor.

It is therefore an object of this invention to provide a novel extension for the drawbar of an earth working implement as above.

Another object of the invention is to provide a drawbar extension which is designed for ready attachment to the drawbar of the implement, and when so attached the extension is in rigid relation to said drawbar as is desirable.

A further object of the invention is to provide a drawbar extension which is simple but rugged in construction; being capable of economic manufacture.

A further object of the invention is to provide a practical and reliable drawbar extension, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the drawbar extension as in use.

Fig. 2 is a fragmentary enlarged sectional elevation showing the connection between the drawbar of the implement and the extension beam.

Fig. 3 is a fragmentary plan view, generally of the structure shown in Fig. 2, but detached from the drawbar.

Referring now more particularly to the characters of reference on the drawings, the drawbar extension, which is indicated generally at 1, is adapted for connection between the conventional drawbar 2 of an earth scraper or leveler, indicated generally at 3, and the hitch 4 of a tractor indicated in part at 5.

In the present embodiment the leveler 3 is of a type which includes a bowl 6 and transversely spaced rear wheels W relatively vertically adjustably mounted in connection with the bowl 6 by a mount, indicated generally at 7, controlled by a longitudinal power cylinder 8 mounted atop said bowl.

The power cylinder 8 is of double acting type, and a pair of hoses 9 lead forwardly from such cylinder for the supply and exhaust of fluid pressure to and from the same.

Below the power cylinder 8 and centrally of the sides of the bowl 6, the leveler 3 includes the forwardly projecting drawbar 2, which is disposed at a forward and downward incline, and fitted, at its front end, with a forwardly projecting swivel eye 10 whose longitudinal axis is substantially horizontal.

The drawbar extension 1 comprises a rigid elongated extension beam 11 which is tubular, and thus hollow, as at 12.

At its forward end the extension beam 11 includes a swivel eye 13 adapted to be detachably connected with the tractor hitch 4 by means of a vertical draft pin 14.

At its rear end the extension beam 11 is affixed, on opposite sides, to longitudinal, rearwardly and upwardly inclined side plates 15 which project some distance to the rear of the beam 11, and the upward inclination of said plates disposes them substantially parallel to the drawbar 2.

In use of the extension the drawbar 2, at its forward end portion, projects between the side plates 15 in close matching relation thereto, and the swivel eye 10 extends into the rear open end portion of the beam 11.

The swivel eye 10 is disposed with the axis of its opening 16 extending in a transverse horizontal plane, and a transverse draft pin 17 extends through said eye, and through the adjacent parts of the beam 11 and side plates 15. In practice this transverse draft pin 17 is in the form of a bolt.

The drawbar 2 projects, short of its forward end between upper and lower cross bolts 18 and 19 which extend between the side plates 15 in vertically spaced relation adjacent the rear or free ends of said plates. The cross bolts 18 and 19 bear directly on the upper and lower edges, respectively, of the drawbar.

With the above described arrangement there is provided an effective and rigid connection between the drawbar 2 and extension beam 11, yet the connection is such that it may be readily attached or detached.

The hoses 9 which normally connect by quick detachable couplings 20 to corresponding hoses 21 leading from the tractor are connected as follows when the extension beam 11 is in use:

The extension beam 11 includes, on top thereof, longitudinal pipes 22 corresponding to said hoses, and held in place on the beam by clamps 23. The quick detachable couplings 20 are used to connect with corresponding fitting parts on the ends of the pipes 22, whereby the later become a part of the fluid pressure system between the tractor 5 and the power cylinder of the leveler 3.

When the extension beam 11 is connected as described and in use, the leveler 3 trails the tractor 5 to a substantially greater distance than normally, and as is desirable for certain types of earth working or leveling operations.

Additionally, the arrangement is such that when the extension is in use, the drawbar is maintained at its normal forward and downward inclination.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. An extension for the drawbar of an implement, comprising a rigid, longitudinal extension beam, means on the front end of the extension beam for connection to the hitch of a tractor, and means on the rear end of the extension beam adapted to rigidly connect the same to the forward end portion of the drawbar of the implement; said drawbar including a projecting eye at the forward end, the rear end portion of the beam being hollow and the eye projecting thereinto, and said last named means including a cross pin extending through the beam and eye.

2. An extension, as in claim 1, in which said last named means includes longitudinal members projecting rearwardly in spaced relation for engagement on opposite parts of the drawbar, and means securing the drawbar against escape from between said members.

3. An extension, as in claim 1, in which said last named means includes longitudinal members projecting rearwardly in spaced relation for engagement on opposite sides of the drawbar, and means securing the drawbar against escape from between said members; said securing means being cross bolts between said members in spaced relation and with the drawbar between said cross bolts.

4. An extension for the drawbar of an implement, comprising a rigid, longitudinal extension beam, means on the front beam for connection to the hitch of a tractor, the drawbar including a projecting eye at the forward end, the rear end of the beam being hollow and the eye engaging therein, a transverse draft pin extending through the beam and eye, transversely spaced side plates secured to the beam at the rear end and projecting some distance rearwardly therefrom on opposite sides of the drawbar, and means securing the drawbar between said plates.

5. An extension for the drawbar of an implement, comprising a rigid, longitudinal extension beam, means on the front beam for connection to the hitch of a tractor, the drawbar including a projecting eye at the forward end, the rear end of the beam being hollow and the eye engaging therein, a transverse draft pin extending through the beam and eye, transversely spaced side plates secured to the beam at the rear end and projecting some distance rearwardly therefrom on opposite sides of the drawbar, and means securing the drawbar between said plates; said securing means being cross bolts between the plates above and below the drawbar.

6. An extension for the drawbar of an implement, comprising a rigid, longitudinal extension beam, means on the front beam for connection to the hitch of a tractor, the drawbar including a projecting eye at the forward end, the rear end of the beam being hollow and the eye engaging therein, a transverse draft pin extending through the beam and eye, transversely spaced side plates secured to the beam at the rear end and projecting some distance rearwardly therefrom on opposite sides of the drawbar, and means securing the drawbar between said plates; said securing means being cross bolts between the plates above and below the drawbar, said cross bolts being a substantial distance to the rear of said transverse draft pin.

7. An extension for the drawbar of an implement, comprising a rigid, longitudinal extension beam, means on the front end of the extension beam for connection to the hitch of a tractor, and means on the rear end of the extension beam adapted to rigidly connect the same to the forward end portion of the drawbar of the implement; there being hoses leading toward the beam from the tractor and implement, a corresponding pipe assembly secured along the beam, and couplings between the hoses and pipe assembly.

ALBERT G. GURRIES.
JOHN A. WHITE, JR.

REFERENCES CITED

The following references are of record in the file of this patent:

UNITED STATES PATENTS

| Number | Name | Date |
| --- | --- | --- |
| 1,289,407 | Davis | Dec. 31, 1918 |
| 1,296,105 | Navratil | Mar. 4, 1919 |